United States Patent [19]

Bresowar et al.

[11] 4,412,653

[45] Nov. 1, 1983

[54] SONIC ATOMIZING SPRAY NOZZLE

[75] Inventors: Gerald E. Bresowar, Homewood; Thomas K. Benton, Birmingham, both of Ala.

[73] Assignee: Combustion Engineering, Inc., Windsor, Conn.

[21] Appl. No.: 308,002

[22] Filed: Oct. 2, 1981

[51] Int. Cl.[3] .............................................. B05B 3/14

[52] U.S. Cl. .................................. 239/102; 239/424; 239/426; 261/DIG. 48

[58] Field of Search ............... 239/102, 424, 426, 434, 239/499; 261/81, DIG. 48

[56] References Cited

U.S. PATENT DOCUMENTS

| | | | |
|---|---|---|---|
| 364,101 | 5/1887 | Gill et al. | 239/424 |
| 3,297,255 | 1/1967 | Fortman | 239/424 |
| 3,464,633 | 9/1969 | Potocnik | 239/424 |
| 3,825,188 | 7/1974 | Doering | 239/499 |
| 4,102,651 | 7/1978 | Kerner et al. | 239/102 |

FOREIGN PATENT DOCUMENTS

| | | | |
|---|---|---|---|
| 979102 | 1/1965 | United Kingdom | 239/424 |
| 643729 | 1/1979 | U.S.S.R. | 239/102 |
| 657217 | 4/1979 | U.S.S.R. | 239/102 |

*Primary Examiner*—John J. Love

*Assistant Examiner*—Michael J. Forman

*Attorney, Agent, or Firm*—William W. Habelt

[57] ABSTRACT

A sonic atomizing spray nozzle (40) wherein a slurry (30) of finely-divided sulfur oxide absorbent particles in a carrier liquid is sprayed into a flue gas stream (12) entering a drying chamber (20) for effecting the removal of sulfur oxides therefrom as a dry salt. The slurry is sprayed through a continuous circumferential slit (70) as a radially outwardly directed thin sheet which traverses an axially-downwardly directed curtain of atomizing gas passing from an annular channel (66) circumscribing and bordering upon the continuous slit (70).

4 Claims, 2 Drawing Figures

SONIC ATOMIZING SPRAY NOZZLE

BACKGROUND OF THE INVENTION

The present invention relates in general to spray dryers, and more particularly, to a spray nozzle for atomizing and spraying a slurry of finely divided material into a spray drying chamber to be contacted with a hot drying gas therein.

Spray drying is well-known in the prior art and has been used for drying solutions or slurries of finely divided particulate material dissolved or suspended in a volatile carrier liquid, most commonly water. The slurry or solution to be processed is atomized and sprayed into a hot gas stream passing through the spray dryer. The volatile carrier liquid is evaporated, and the dissolved or suspended particulate material dried to a fine powder. Spray drying has for many years been used for drying and processing food products, pharmaceuticals, and many other powder products.

More recently, spray drying has been found to be an effective method for treating flue gases from fossil fuel-fired furnaces to remove gaseous pollutants, most commonly sulfur dioxide, therefrom. In such an application, a solution or slurry of sulfur oxide absorbent, such as lime, limestone, soda ash, or caustic soda, in water is atomized and sprayed into the spray drying chamber to contact hot flue gas from the furnace. As the water in the slurry or solution is evaporated by heat from the hot flue gas, the sulfur oxide absorbent reactant contained therein reacts with sulfur dioxides contained in the flue gas. The resultant product is a dry powder of sulfur-containing salt.

A typical spray dryer generally comprises a housing defining a spray drying chamber designed to provide the proper environment and residence time for efficient drying of the solution or slurry. The drying gas is typically introduced to the vessel through an inlet at the top thereof and an outlet near the bottom thereof. The solution or slurry of particulate material to be dried is sprayed into the vessel in a finely divided form through atomization means. The atomized solution or slurry is sprayed into the hot drying gas as it enters the spray drying chamber so as to intermix with the hot gas so that the volatile carrier liquid is evaporated and the dissolved or suspended particulate material reduced to a fine, dry powder.

One type of atomization means being used in spray drying applications is a sonic atomizing spray nozzle. In such a device, sound waves are generated by impinging a high-velocity stream of a gas, most commonly air, against a resonator, disposed at the outlet of the spray nozzle. Simultaneously, the liquid solution or slurry to be atomized is injected into the zone of sound waves generated by discharging the high-velocity gas against the resonator. The vibrations from the resonating sound waves possess considerable energy and as a result, atomize the liquid into very fine droplets.

It is extremely important in most all spray dryer applications, and in particular in spray dryers applied to sulfur oxide scrubbing, that good liquid atomization resulting in very fine droplet size be achieved. Often a sonic spray nozzle design proven in the laboratory fails to achieve this goal in field application as good atomization is frequently lost during scale-up because the ratio of the atomizing gas flow area to the area of the liquid flow area is not maintained constant at the value found in the laboratory to yield good atomization. Alternatively, scaled-up sonic spray nozzles wherein particular care is taken to maintain a constant flow area ratio often suffer from loss of intimate contact between the liquid and the atomizing gas and uneven slurry distribution in the spray dryer.

SUMMARY OF THE INVENTION

It is, therefore, an object of the present invention to provide a sonic atomizing spray nozzle which is adapted to be scaled-up to handle increased slurry flow rates while maintaining good atomization by holding a constant atomizing gas flow area to liquid flow area ratio and simultaneously ensuring even spray distribution and intimate contact between the liquid to be atomized and the atomizing gas.

Toward the fulfillment of this and other objectives which will be evident from the following description, the sonic atomizing spray nozzle of the present invention comprises a support body, an open-ended outer cylindrical shell extending therefrom, an open-ended inner shell disposed coaxially within the outer cylindrical shell, and a resonator plate spaced from and facing the open end of the inner shell and disposed coaxially therewith. An atomizing gas plenum is defined between the inner and outer shells and a liquid plenum is defined within the interior of the inner shell between the resonator plate and the inner shell.

An annular channel is defined between the outer surface of the open end of the inner shell and the inner surface of the open end of the outer shell which serves as a flow passage between the atomizing gas plenum and the open end of the outer shell through which atomizing gas is passed axially to impinge the resonator plate and generate a series of sound waves which atomize the liquid. A continuous circumferential slit is defined between the end face of the open end of the inner shell and the surface of the resonator plate through which the slurry or solution to be atomized passes radially outwardly into the zone of sound waves established adjacent the open end of the outer cylindrical shell.

The annular channel through which the atomizing gas passes and the circumferential slit through which the liquid passes are disposed at right angles to each other. The flow area of the annular channel is equal to the product of the outer perimeter of the inner shell and width of the channel. The flow area of the circumferential slit is equal to the product of the outer perimeter of the inner shell and the width of the slit. Accordingly, the ratio of gas flow area to liquid flow area is equal to the ratio of the width of the annular chamber to the width of the circumferential slit and is independent of the perimeter of the inner shell. As the flow area for slurry is directly proportional to the perimeter of the inner shell, the flow area can be increased in scaling for higher slurry flow rates without changing the ratio of gas flow area to liquid flow rate. Therefore, the nozzle of the present invention is capable of scale-up without disturbing atomization because the flow area ratio remains constant.

Furthermore, intimate contact between liquid and atomizing gas is ensured because their respective injection ports both border the outer perimeter of the inner shell and are disposed at right angles to each other. Uniform distribution of liquid spray is ensured by providing a circumferentially continuous slit through which liquid is injected into the spray dryer from the liquid plenum of the nozzle.

DETAILED DESCRIPTION OF A PREFERRED EMBODIMENT

Figure 1:
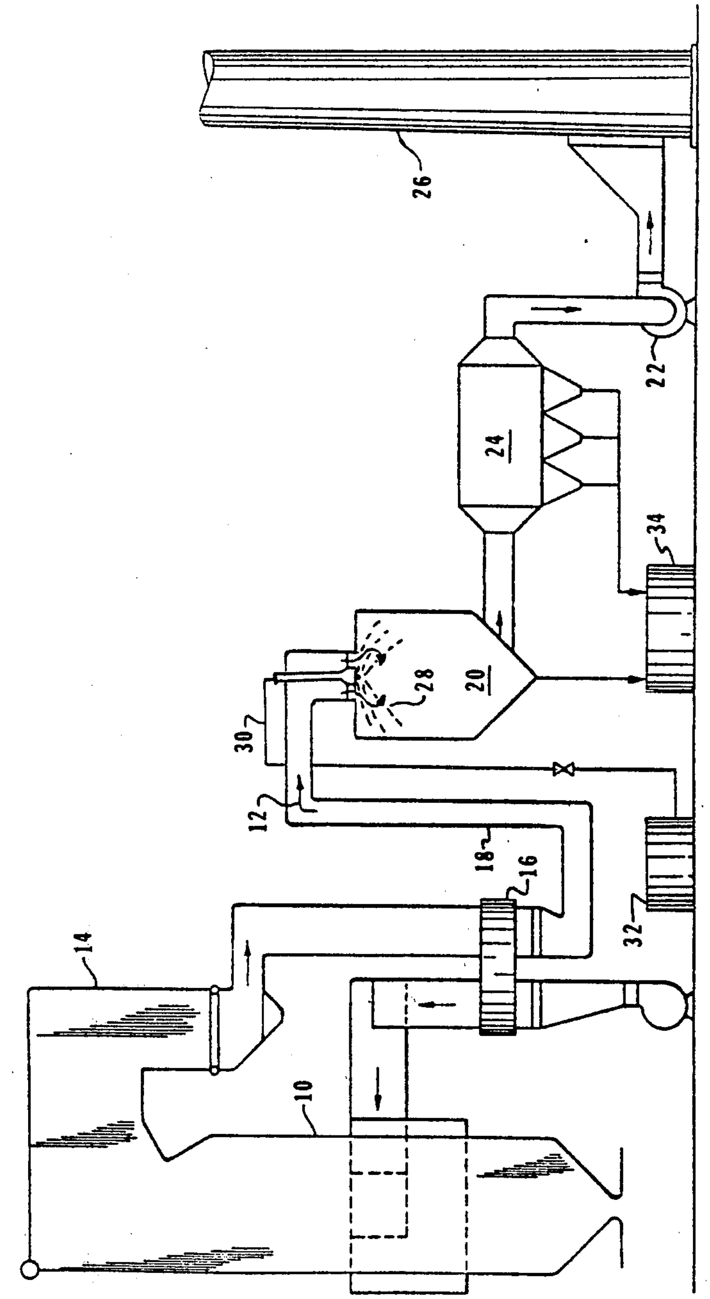
FIG. 1 is a schematic flow diagram illustrating a spray dryer apparatus embodying the spray nozzle of the present invention, the spray drying apparatus being employed as an absorption chamber for removing sulfur oxides from hot flue gases as a dry sulfur-bearing salt.

While the specification concludes with claims particularly pointing out and distinctly claiming a spray nozzle which may be utilized in any spray dryer apparatus where a slurry or solution is to be contacted with a hot drying gas in order to dry the liquid carrier and reduce the dissolved slurried solids to a fine dry powder, it is believed that the invention can be best described and better understood from the following description of a preferred embodiment of the present invention in conjunction with a spray dryer apparatus being utilized as an absorption chamber employed in removing sulfur oxides from hot flue gases generated in a fossil fuel-fired furnace. It is to be understood, however, that the spray nozzle of the present invention can also be used in many other spray drying applications well-known in the prior art. Referring now to the drawing and to FIG. 1 in particular, therein is depicted a schematic flow diagram illustrating a spray drying apparatus employed as an absorption chamber for removing sulfur oxides from hot flue gas generated in a fossil fuel-fired furnace. A sulfur-bearing fossil fuel, such as oil or coal, is combusted with air in furnace 10 to form combustion products termed flue gas 12. The flue gas, including sulfur oxide gases generated during the combustion of the sulfur-bearing fuel within the furnace 10, exits from the furnace through convection bank 14. The hot flue gas traversing convection bank 14 passes over various heat exchange surfaces immersed therein in heat exchange relationship with a liquid such as water flowing through the heat exchange surface to generate steam. The flue gas leaving convection bank 14 is then typically passed through an air heater 16 to preheat the combustion air being supplied to the furnace 10. As the flue gas passes through air heater 16, being in indirect heat exchange relationship with the combustion air being conveyed to the furnace, the flue gas is cooled to a temperature typically in the range of 100 to 200 C.

From the air heater, the flue gas 12 passes through duct 18 to one or more spray dryer absorption chambers 20. Having traversed the spray dryer absorption chambers 20, the flue gas is drawn by induced draft fan 22 through a dry particulate collector 24 and thence to a stack 26 for venting to the atmosphere.

As the hot flue gas 12 passes through the spray dryer absorption chamber 20, it contacts an atomized spray 28 of sulfur oxide absorbent slurry 30 supplied from slurry prep tank 32. The slurry 30 is prepared in slurry prep tank 32 by mixing a sulfur oxide absorbent such as lime, calcium hydroxide, soda ash, or caustic soda with a volatile carrier liquid, most commonly water. The sulfur oxide absorbent within the slurry reacts with the sulfur oxides contained in the flue gas as it passes through spray dryer 20 forming sulfur-containing salts. At the same time, the water in the slurry is evaporated by the sensible heat content of the hot flue gas whereby the sulfur-containing salts are reduced to a fine powder so that only dry particulates remain within the flue gas. While much of the dry particulate precipitates from the flue gas in the hopper of the spray dryer 20, the remainder of the dry particulate is removed from the flue gas as it passes through the dry particulate collector 24 disposed downstream of the spray dryer 20. The dry sulfur-containing particulate from the spray dryer 20 in the dry particulate collector 24 is passed to collection tank 34 for subsequent disposal.

In order to obtain optimal sulfur oxide absorption efficiencies and to completely dry the resultant salts to a fine powder, it is extremely important that the reactant slurry be brought into intimate contact with the hot drying gas as a finely atomized, mist-like spray. In accordance with Applicants' invention, there is provided a spray nozzle specifically designed to provide intimate contact between the hot gas and a continuous circumferential thin sheet of slurry sprayed radially outwardly through the atomizing gas into hot flue gas as it enters the drying chamber.

Figure 2:
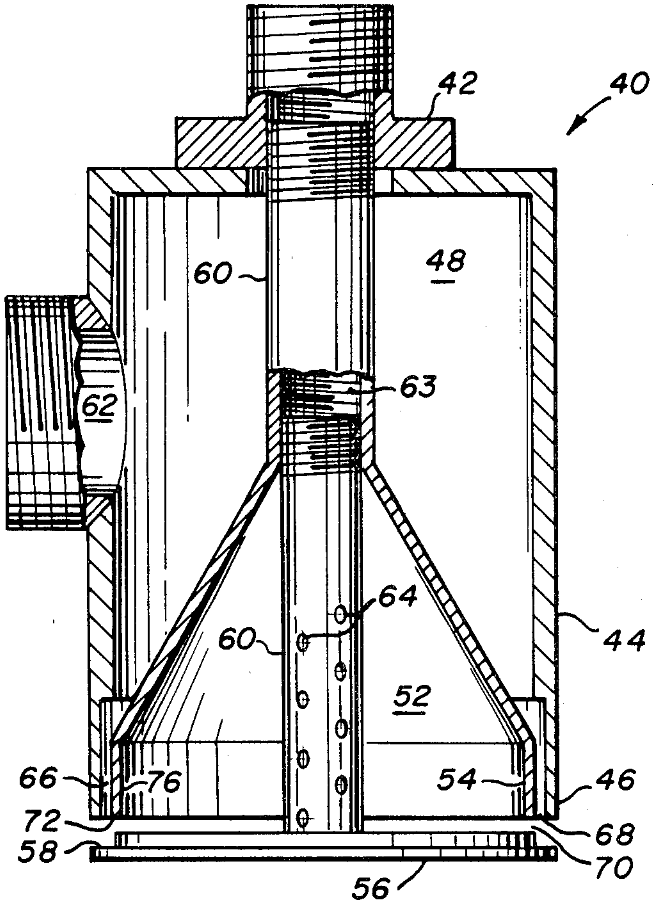
FIG. 2 is a side elevational, cross-sectional view of the spray nozzle of the present invention.

Referring now to FIG. 2, there is depicted therein a spray nozzle 40 having a support body 42 with an outer cylindrical shell 44 extending downwardly therefrom terminating with an open end 46 at its lower extreme. The interior of the outer cylindrical shell 44 is divided into an upper chamber 48 and a lower chamber 52 by an open-ended inner shell 50 disposed coaxially within the outer shell 44 with its open end 54 extending through the open end 46 of the outer cylindrical shell 44. A resonator plate 56 having a recessed rim 58 about its outer circumference is spaced from and facing the open end 54 of the inner shell 50 and is disposed substantially coaxially therewith. A stem 60 extends coaxially through the inner and outer shells to link the resonator plate 56 to the support body 42 for supporting the resonator plate 56 therefrom.

The upper chamber 48 forms an atomizing gas plenum and is connected in fluid communication with a supply of atomizing gas, most commonly compressed air, through atomizing gas feed inlet 62 which opens into the plenum 48. The lower chamber 52 forms a liquid, i.e., slurry or solution, plenum chamber which is connected in fluid communication with prep tank 32 through liquid feed means 64. In the preferred embodiment, the stem 60 connecting the resonator plate 56 to the support body 42 comprises a tubular shell, the interior 63 of which provides a flow path through which slurry is fed to the lower chamber 52. A plurality of openings 64 in the wall of the tubular stem 60 provide fluid communication between the interior of the stem 60 and the liquid plenum 52.

An annular channel 66 is formed between the outer surface of the open end 54 of the inner shell 50 and the inner surface of the open end 46 of the outer cylindrical shell 44. The annular channel 66 provides a flow passage for atomizing gas to pass from the atomizing gas plenum 48 out of the open end 46 of the outer shell 44 to impinge against the recessed rim 58 of the resonator plate 56 to generate sound waves. The flow area of the annular opening 68 at the end of the annular channel 66 is equal to the product of the outer perimeter 72 of the inner shell 50 and the width of the channel 66.

A continuous circumferential slit 70 is formed between the resonator plate 56 and the end face of the open end 54 of the inner shell 50. The continuous circumferential slit 70 provides a liquid passage for flow communication between the liquid plenum 52 and the zone of sound waves existing adjacent the open end 46 of the outer cylindrical shell 44. The continuous circumferential slit 70 provides for a sheet of liquid being sprayed into the spray dryer thereby ensuring that uniform distribution of liquid spray is achieved.

As seen in FIG. 2, the continuous circumferential slit 70 and the opening 68 to the annular channel 66 are disposed at right angles to each other and share a common boundary: the outer perimeter 72 of the open end 54 of the inner shell 50. Intimate contact is ensured between liquid and atomizing gas as the liquid is injected radially outwardly through slit 70 and must traverse the atomizing gas passing axially downward through opening 68 at the end of the annular channel 66.

The flow area of the continuous slit 70 is equal to the product of the outer perimeter 72 of the inner shell 50 and the width of the slit 70. As the continuous slit 70 and the annular opening 68 share the perimeter 72 of the inner shell 50 as a common boundary, the ratio of atomizing gas flow area to liquid flow area is equivalent to the ratio of the width of the annular opening 68 to the width of the continuous slit 70.

Therefore, in the nozzle of the present invention, the ratio of the gas flow area to liquid flow area is independent of the outer perimeter dimension of the inner shell 50 even though both flow areas are directly dependent thereupon. Accordingly, a nozzle can be scaled-up to handle higher liquid flow rates, and therefore higher atomizing gas rates, simply by increasing the perimeter of the inner shell in a linear fashion. Both the gas flow area and liquid flow area would increase in direct proportion to the increase in perimeter while the ratio of the gas flow area to the liquid flow area, and therefore the atomization characteristics of the nozzle, would remain the same.

In the preferred embodiment of the invention shown in FIG. 2, the inner shell 50 comprises an open-ended conical annular shell 74 extending outwardly from the stem 60 toward the outer shell 44 at its open end. A cylindrical rim 76 extends axially downward from the conical shell 74 in closely-spaced relationship to the open end 46 of the outer cylindrical shell 44. The annular channel 66 is defined by the circumferential space between the outer surface of the cylindrical rim 76 and the inner surface of the outer cylindrical shell 44. The continuous slit 70 is defined by the gap between the end face of the cylindrical rim 76 and the resonator plate 56. The outer radial edge of the cylindrical rim 76 serves as a common boundary for the continuous slit 70 and the annular opening 68.

An additional aspect of the present invention which warrants particular mention is the provision of a streamline surface as provided by the outer surface of the cylindrical shell 44. In most prior art nozzles, the outer surface of the nozzle body turns inward toward the center of the nozzle at the lower end of the nozzle. This inwardly projecting surface provides an area adjacent the slurry injection ports for particles in the slurry to strike and stick to resulting in a deposit forming thereon which can adversely effect nozzle performance. The provision of a cylindrical outer shell precludes any buildup of deposits of the outer surface of the nozzle as no portion of the outer surface of the outer cylindrical shell 44 is exposed to slurry contact.

While a preferred embodiment of the present invention has been shown and described for purposes of illustration and complying with the best mode requirements of 35 USC 112, it is evident that certain aspects of the invention are not limited to the particular details illustrated in the drawing and discussed in the specification. Therefore, the invention described herein is not to be construed as limited to the specific embodiment of a spray dryer apparatus for sulfur oxide removal as described herein, but is intended to encompass all variations and applications that do not depart from the spirit and scope of the invention as described in the appended claims.

We claim:

1. A spray nozzle comprising:

a. a support body;

b. an open-ended outer cylindrical shell extending from said support body;

c. a support stem extending from said support body coaxially through said outer cylindrical shell and open end thereof;

d. an open-ended inner shell disposed coaxially within and in spaced relationship from said outer shell so as to define a first plenum chamber between said inner shell and said outer shell and a second plenum chamber within the interior of said inner shell, the open end of said inner shell extending to the open end of said outer shell in closely spaced relationship therewith thereby defining a circumferentially continuous annular channel between the outer wall of said inner shell and the inner wall of said outer shell, said annular channel providing a gas passage for flow communication between said first plenum chamber and the open end of said outer shell, and providing an annular discharge outlet;

e. a resonator plate supported from said stem in spaced relationship from and facing the open end of said inner shell and disposed substantially coaxially therewith thereby defining a continuous circumferential slit between said resonator plate and the open end of said inner shell about the outer edge thereof, said continuous circumferential slit providing a liquid passage for flow communication between the second plenum chamber and the open end of said outer shell, said circumferential slit and said annular channel disposed at substantially right angles along the outer edge of said inner shell, said annular discharge outlet discharging on said resonator plate;

f. atomizing gas-feeding means communicating with said first plenum chamber; and g. liquid-feeding means communicating with said second plenum chamber.

2. A spray nozzle as recited in claim 1 wherein said stem comprises a tubular shell having a plurality of holes in its wall opening into said liquid plenum chamber, said stem communicating with said liquid feeding means and providing a flow passage to said liquid plenum chamber.

3. A spray nozzle comprising:

a. a support body;

b. An open-end cylindrical outer shell extending from said support body;

c. A support stem extending from said support body coaxially through said cylindrical outer shell and the open end thereof;

d. an open-end conical inner shell disposed coaxially within said cylindrical outer shell and extending outwardly from said stem toward said cylindrical outer shell thereby defining a first plenum chamber between said conical inner shell and said cylindrical outer shell and a second plenum chamber within the interior of said conical inner shell, said conical inner shell having a cylindrical rim extending axially therefrom at its open end in closely-spaced relationship to said cylindrical outer shell to the open end of said cylindrical outer shell thereby defining a circumferentially continuous annular channel between the outer surface of the cylindrical rim and the inner surface of said cylindrical outer shell, said circumferentially continuous annular channel extending between said first plenum chamber and the open end of said cylindrical outer shell, and providing an annular discharge outlet;

e. a resonator plate supported from said stem in spaced relationship from and facing the open end of said inner shell and disposed substantially coaxially therewith thereby defining a continuous circumferntial slit between said resonator plate and the open end of said conical inner shell about the outer edge of the cylindrical rim extending from said inner shell providing a flow passage between said second plenum chamber and the open end of said outer shell, said continuous circumferential slit and said annular channel disposed at right angles to each other along the outer circumferential edge of the cylindrical rim extending from said conical inner shell, said annular discharge outlet discharging on said resonator plate;

f. atomizing gas-feeding means communicating with said first plenum chamber; and g. liquid-feeding means communicating with said second plenum chamber.

4. A spray nozzle as recited in claim 3 wherein said support stem comprises a tubular shell communicating with said liquid-feeding means and having a plurality of holes in its wall opening into said second plenum chamber thereby providing flow passageway from said liquid-feeding means to said second plenum chamber.

* * * * *